(12) United States Patent
Kumura

(10) Patent No.: US 8,990,511 B2
(45) Date of Patent: Mar. 24, 2015

(54) MULTIPROCESSOR, CACHE SYNCHRONIZATION CONTROL METHOD AND PROGRAM THEREFOR

(75) Inventor: Takahiro Kumura, Tokyo (JP)

(73) Assignee: NEC Corporation, Tokyo (JP)

( * ) Notice: Subject to any disclaimer, the term of this patent is extended or adjusted under 35 U.S.C. 154(b) by 1077 days.

(21) Appl. No.: 12/734,421

(22) PCT Filed: Oct. 31, 2008

(86) PCT No.: PCT/JP2008/069918
§ 371 (c)(1),
(2), (4) Date: Apr. 30, 2010

(87) PCT Pub. No.: WO2009/057762
PCT Pub. Date: May 7, 2009

(65) Prior Publication Data
US 2011/0047335 A1 Feb. 24, 2011

(30) Foreign Application Priority Data
Nov. 1, 2007 (JP) .................................. 2007-285299

(51) Int. Cl.
*G06F 12/00* (2006.01)
*G06F 12/08* (2006.01)
*G06F 9/52* (2006.01)

(52) U.S. Cl.
CPC .............. *G06F 12/0842* (2013.01); *G06F 9/52* (2013.01); *G06F 12/0837* (2013.01)
USPC ............ 711/143; 711/119; 711/141; 711/147

(58) Field of Classification Search
None
See application file for complete search history.

(56) References Cited

U.S. PATENT DOCUMENTS 6,378,066 B1   4/2002  Lewis
6,829,665 B2 * 12/2004  Jones et al. ................... 710/107
(Continued)

FOREIGN PATENT DOCUMENTS

JP      9-62576     3/1997
JP      9-62580     3/1997
(Continued)

OTHER PUBLICATIONS

Hidetsugu Iwata, et al., "Integrated Parallelizing Compiler System-Compiler-Assisted Cache Coherence Scheme-", IPSJ SIG Notes, Jul. 18, 1990, vol. 90, No. 60, (90-ARC-83), pp. 121-126.
(Continued)

*Primary Examiner* — Shawn X Gu
(74) *Attorney, Agent, or Firm* — McGinn IP Law Group, PLLC

(57) ABSTRACT

There is provided a cache synchronization control method by which contents of a plurality of caches can be synchronized without a programmer explicitly setting a synchronization point, and the contents of the caches can be synchronized without scanning all cache blocks. A cache synchronization control method for a multiprocessor that has a plurality of processors having a cache, and a storage device shared by the plurality of processors, the method comprises: before a task is executed, a first step of writing back input data of the task to the storage device by a processor that manages the task and deleting data corresponding to the input data from its own cache by a processor other than the processor; and after the task is executed, a second step of writing back output data of the task to the storage device by a processor that has executed the task and deleting data corresponding to the output data from its own cache by a processor other than the processor.

11 Claims, 15 Drawing Sheets

(56) References Cited

U.S. PATENT DOCUMENTS

| | | |
|---|---|---|
| 2002/0162089 A1 | 10/2002 | Lewis et al. |
| 2004/0015929 A1 | 1/2004 | Lewis et al. |
| 2004/0015969 A1* | 1/2004 | Chang .......................... 718/100 |
| 2008/0215817 A1 | 9/2008 | Nonogaki et al. |

FOREIGN PATENT DOCUMENTS

| | | |
|---|---|---|
| JP | 2000-285084 | 10/2000 |
| JP | 2001-175619 | 6/2001 |
| JP | 2008-204292 | 9/2008 |

OTHER PUBLICATIONS

Per Stenstroem, "A Survey of Cache Coherence Schemes for Multi-processors," IEEE Computer, (USA), 1990, vol. 23, No. 6, pp. 12-24.

* cited by examiner

FIG. 8

```
void
add_vectors_4 (int *out, int *w, int *x, int *y, int *z, int k, int len)
{
  int i;
  for ( i=0 ; i<len ; i++ )
  {
    out[i] = w[i] + x[i] + y[i] + z[i] + k;
  }
}
```

FIG. 9

```
struct operand {
  void *addr;
  int size;
};
typedef void (*task_func_t) (struct operand *op_out, struct operand *op_in);
void exec_task (task_func_t task, struct operand *op_out, struct operand *op_in);
void
add_vec_2_scalar (struct operand *op_out, struct operand *op_in)
{
  int i;
  int *a = op_in[0].addr;
  int *b = op_in[1].addr;
  int *k = op_in[2].addr;
  int *c = op_out[0].addr;
  int len = (op_in[0].size) / sizeof (int);
  for ( i=0 ; i<len ; i++ )
  {
    c[i] = a[i] + b[i] + (*k);
  }
}
void
add_vectors_4 (int *out, int *w, int *x, int *y, int *z, int k, int len)
{
  int i;
  int size_in_byte = len * sizeof (int);
  int *sum_wx = (int*) malloc (size_in_byte);
  int *sum_yz = (int*) malloc (size_in_byte);
  int *value  = (int*) malloc (sizeof (int));
  struct operand op_in0[]  = {{w, size_in_byte},
                              {x, size_in_byte},
                              {value, sizeof (int)}, {0,0}};
  struct operand op_out0[] = {{sum_wx, size_in_byte}, {0,0}};
  struct operand op_in1[]  = {{y, size_in_byte},
                              {z, size_in_byte},
                              {value, sizeof (int)}, {0,0}};
  struct operand op_out1[] = {{sum_yz, size_in_byte}, {0,0}};
  struct operand op_in2[]  = {{sum_wx, size_in_byte},
                              {sum_yz, size_in_byte},
                              {value, sizeof (int)}, {0,0}};
  struct operand op_out2[] = {{out, size_in_byte},  {0,0}};
  struct operand op_sync0[] = {{value, sizeof (int)}, {0,0}};
  *value = k;
  exec_task (add_vec_2_scalar, op_out0, op_in0, op_sync0); /* task1: sum_wx[i]=w[i]+x[i]+k     */
  *value = 0;
  exec_task (add_vec_2_scalar, op_out1, op_in1, op_sync0); /* task2: sum_yz[i]=y[i]+z[i]+0    */
  exec_task (add_vec_2_scalar, op_out2, op_in2, 0);        /* task3: out[i]=sum_wx[i]+sum_yz[i]+0 */
  free (sum_wx);
  free (sum_yz);
  free (value);
}
```

MULTIPROCESSOR, CACHE SYNCHRONIZATION CONTROL METHOD AND PROGRAM THEREFOR

CROSS-REFERENCE TO RELATED APPLICATION

This application is based upon and claims the benefit of the priority of Japanese Patent Application No. 2007-285299 (filed on Nov. 1, 2007), the disclosure of which is incorporated herein in its entirety by reference thereto.

The present invention relates to a multiprocessor, and a cache synchronization control method and program therefor.

BACKGROUND

Technical Field

With regard to a multiprocessor, in a case where each processor possesses a cache, a mechanism is necessary for maintaining cache coherence. Heretofore, various mechanisms (cache synchronization mechanisms) for maintaining cache coherence have been considered (Non-Patent Document 1).

A barrier synchronization method is one of cache synchronization mechanisms. In the barrier synchronization method, complex hardware is not necessary. Patent Document 1 describes a specific example of a barrier synchronization method. In the barrier synchronization method described in Patent Document 1, when a program counter of a processor reaches a position referred to as a synchronization point, all cache blocks changed at that point in time are written back to main memory.

In a barrier synchronization method disclosed in Patent Document 2, the barrier synchronization method of Patent Document 1 is improved. In the barrier synchronization method of Patent Document 2, information on whether or not there is shared data, is attached to the cache block, and by using this information, it is possible to reduce the number of cache blocks to be written back to the main memory at a synchronization point.

[Patent Document 1] JP Patent Kokai Publication No. JP-A-09-62576
[Patent Document 2] JP Patent Kokai Publication No. JP-A-09-62580
[Patent Document 3] JP Patent Kokai Publication No. JP-P2001-175619A
[Patent Document 4] JP Patent Kokai Publication No. JP-P2000-285084A
[Non-Patent Document 1] Per Stenstroem, "A Survey of Cache Coherence Schemes for Multiprocessors," IEEE Computer, (USA), 1990, Vol. 23, No. 6, pp. 12-24

The entire disclosures of the abovementioned Patent Documents 1 to 4 and Non-Patent Document 1 are incorporated herein by reference thereto. An analysis of related technology according to the present invention is given as follows. The following analysis was performed by the present inventors.

Barrier synchronization methods according to Patent Document 1 and Patent Document 2 have the following problems.

A first problem is the point that it is a programmer who appropriately sets a synchronization point. A second problem is the point that, in order to judge which cache block to write back to main memory, it is necessary to scan all cache blocks. Each of these problems commonly appears in general barrier synchronization methods.

Due to the first problem, program development becomes difficult. If the programmer appropriately sets a synchronization point, it is possible to eliminate unnecessary synchronization processing. However, in a case where a synchronization point is not appropriately set, an error occurs in program operation. In order to appropriately set the synchronization point, it is necessary that the programmer adequately grasps a data sharing method and order and timing of processing the data. Since correctly understanding the timing of the data processing is particularly troublesome, appropriate setting of the synchronization point is a complicated task for a programmer.

Due to the second problem, the time required for the barrier synchronization increases. For example, if a block size is 32 bytes, there are 256 cache blocks in an 8 k byte sized cache. In a case where one cycle is required to scan one cache block, 256 cycles are needed to scan all the cache blocks.

Therefore, there is a need in the art to provide a cache synchronization control method in which contents of a plurality of caches can be synchronized without a programmer explicitly setting a synchronization point, and the contents of the caches can be synchronized without scanning all the cache blocks.

A cache synchronization control method according to a first aspect of the present invention is a cache synchronization control method for a multiprocessor that has a plurality of processors having a cache, and a storage device shared by the plurality of processors, the method comprising: before a task is executed, first writing back input data of the task to the storage device by a processor that manages the task and deleting data corresponding to the input data from its own cache by a processor other than the processor; and after the task is executed, second writing back output data of the task to the storage device by a processor that has executed the task and deleting data corresponding to the output data from its own cache by a processor other than the processor. In the cache synchronization control method of a first modified embodiment, the first writing back and deleting may comprise notifying a processor other than the processor to delete data corresponding to the input data from its own cache by the processor that manages the task; and the second writing back and deleting may comprise notifying a processor other than the processor to delete data corresponding to the output data from its own cache by the processor that has executed the task. A cache synchronization control method according to a second aspect of the present invention is a cache synchronization control method for a multiprocessor configured to include a plurality of processors, a cache associated with each processor, a storage device, and a network connecting these, the method controlling synchronization of the cache, when a program is divided into a plurality of small programs referred to as tasks, data given from another task to a task is termed as input data, data to be transferred by a task to another task is termed as output data, and the task is executed in the multiprocessor, the method comprising: before a task is executed, first writing back input data of the task to a storage device by a processor that manages the task and deleting an old copy of input data of the task from a cache of another processor; and after a task is executed, second writing back output data of a task from a cache to a storage device and deleting an old copy of output data of a task from a cache of another processor.

In the cache synchronization control method in one modified embodiment of the present invention, information on which input data should be written back to a storage device may be given; and the first writing back and deleting may comprise writing back only input data specified by the information from a cache to a storage device.

A multiprocessor according to a third aspect of the present invention is a multiprocessor comprising: a plurality of processors having a cache; and a storage device shared by the plurality of processors; wherein before a task is executed, a processor that manages the task writes back input data of the task to the storage device, and a processor other than the processor deletes data corresponding to the input data from its own cache; and after the task is executed, a processor that has executed the task writes back output data of the task to the storage device, and a processor other than the processor deletes data corresponding to the output data from its own cache. In the multiprocessor in a third modified embodiment, the plurality of processors may include a master processor and a slave processor; the slave processor may executes the task; and the master processor may assign the task to the slave processor. The multiprocessor in a fourth modified embodiment may further comprise a bus linking the plurality of processors and the storage device. A multiprocessor according to a fourth aspect of the present invention is a multiprocessor comprising a plurality of processors, a cache associated with each processor, a storage device, and a network connecting these, configured to divide a program into a plurality of small programs referred to as tasks, and to execute each task in any of the processors, wherein each of the plurality of processors comprises a data write-back unit and a data deletion unit; the data write-back unit is configured so that, before execution of each task, input data is written back to a storage device from a cache holding input data of the task, and furthermore, after execution of each task, output data is written back to a storage device from a cache holding output data of the task; and the data deletion unit is configured so that an old copy of input data is deleted from a cache holding the old copy of the input data written back to a storage device by the data write-back unit before execution of each task, and furthermore, an old copy of output data is deleted from a cache holding the old copy of the output data written back to a storage device by the data write-back unit after execution of each task.

A multiprocessor according to a fifth aspect of the present invention is a multiprocessor comprising: a master processor configured to control task execution order based on input data and output data of a task, when a program is divided into a plurality of small programs referred to as tasks, data given by another task to a task is termed as input data, and data to be transferred by a task to another task is termed as output data; at least one slave processor configured to execute a task; a storage device configured to store input data and output data of a task; and a network configured to connect both of the processors and a storage device; wherein both of the processors comprise a cache, a data write-back unit, and a data deletion unit; the data write-back unit is configured so that, before execution of each task, input data is written back to a storage device from a cache holding input data of the task, and furthermore, after execution of each task, output data is written back to a storage device from a cache holding output data of the task; and the data deletion unit is configured so that an old copy of input data is deleted from a cache holding the old copy of the input data written back to a storage device by the data write-back unit before execution of each task, and furthermore, an old copy of output data is deleted from a cache holding the old copy of the output data written back to a storage device by the data write-back unit after execution of each task.

A cache synchronization control program according to a sixth aspect of the present invention is a cache synchronization control program for a multiprocessor that has a plurality of processors having a cache, and a storage device shared by the plurality of processors; wherein before execution of a task, the program causes a processor that manages the task to write back input data of the task to the storage device, and causes a processor other than the processor to delete data corresponding to the input data from its own cache; and after execution of the task, the program causes a processor that has executed the task to write back output data of the task to the storage device, and causes a processor other than the processor to delete data corresponding to the output data from its own cache. A cache synchronization control program according to a seventh aspect of the present invention is a cache synchronization control program for a multiprocessor configured to include a plurality of processors, a cache associated with each processor, a storage device, and a network connecting these, the cache synchronization control program causing the processor to execute synchronization control of the cache, when a program is divided into a plurality of small programs referred to as tasks, and each task is executed in any of the processors, the program causing the processor to execute: before execution of each task, writing back input data to a storage device from a cache holding input data of the task, and deleting an old copy of the input data from a cache holding the old copy of the input data; and after execution of each task, writing back output data to a storage device from a cache holding output data of the task, and deleting an old copy of the output data from a cache holding the old copy of the output data.

The present invention provides the following advantages, but not restricted thereto. By the cache synchronization control method according to the present invention, it is possible to synchronize contents of a plurality of caches without a programmer explicitly setting a synchronization point. Furthermore, by the cache synchronization control method according to the present invention, it is possible to synchronize the contents of the caches without scanning all cache blocks.

Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIG. 8 is a drawing representing a C language function for adding four vectors and one scalar value.

FIG. 9 is a drawing representing a function, which is a C language function equivalent to FIG. 8, transformed so as to use the cache synchronization control method according to an exemplary embodiment.

Explanations of symbols are given in the following description.

PREFERRED MODES

<Exemplary Mode>

In the present disclosure, there are various possible modes, which include the following, but not restricted thereto. A detailed description is given concerning a cache synchronization control method for a multiprocessor according to an exemplary embodiment, making reference to the drawings.

Figure 4:
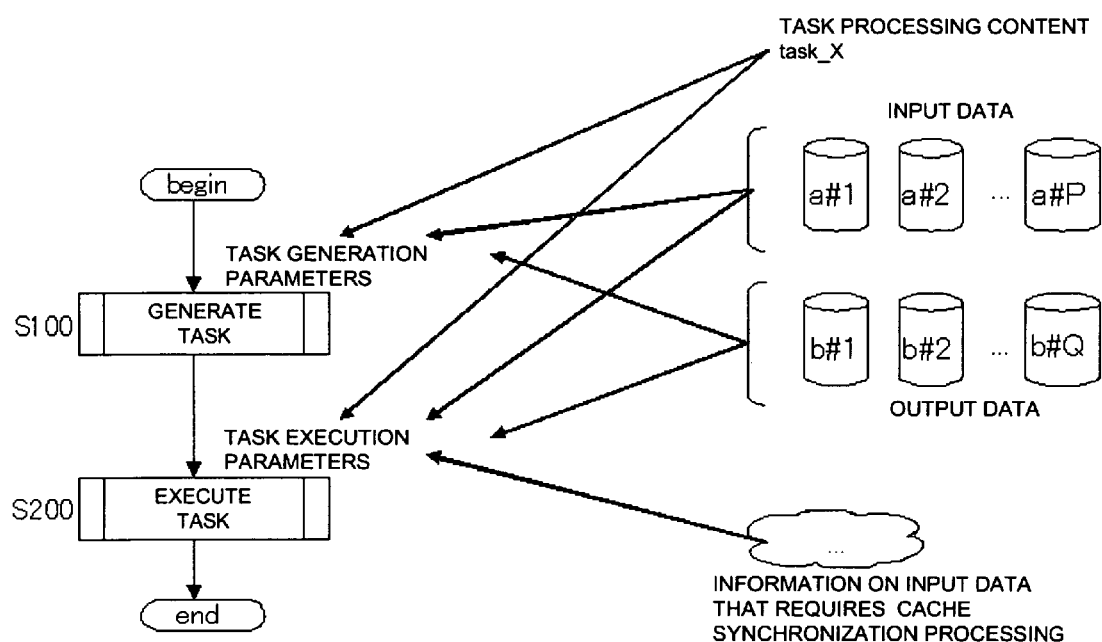
FIG. 4 is a flow chart of a cache synchronization control method according to an exemplary embodiment.

FIG. 4 is a flow chart of the cache synchronization control method according to the present exemplary embodiment.

The cache synchronization control method includes a step of generating a task (step S100), and a step of executing the task (step S200).

Figure 5:
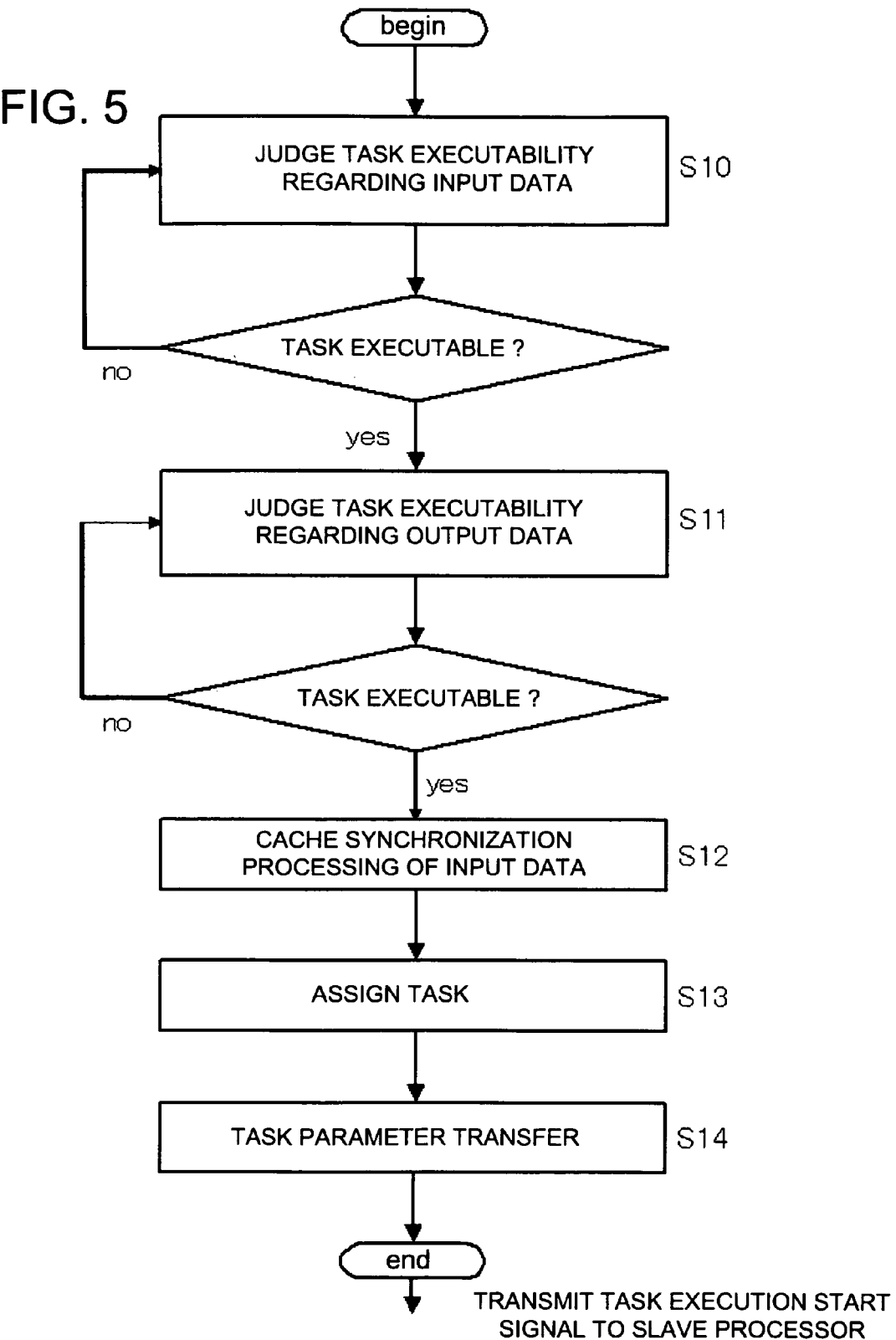
FIG. 5 is a flow chart of task generation in the cache synchronization control method according to an exemplary embodiment.

FIG. 5 shows a specific procedure of the task generation step (step S100).

The task generation step (step S100), making reference to FIG. 5, includes steps of judging task executability with regard to input data (step S10), judging task executability with regard to output data (step S11), cache synchronization processing of input data (step S12), task assignment (step S13), and task parameter transfer (step S14).

Figure 6:
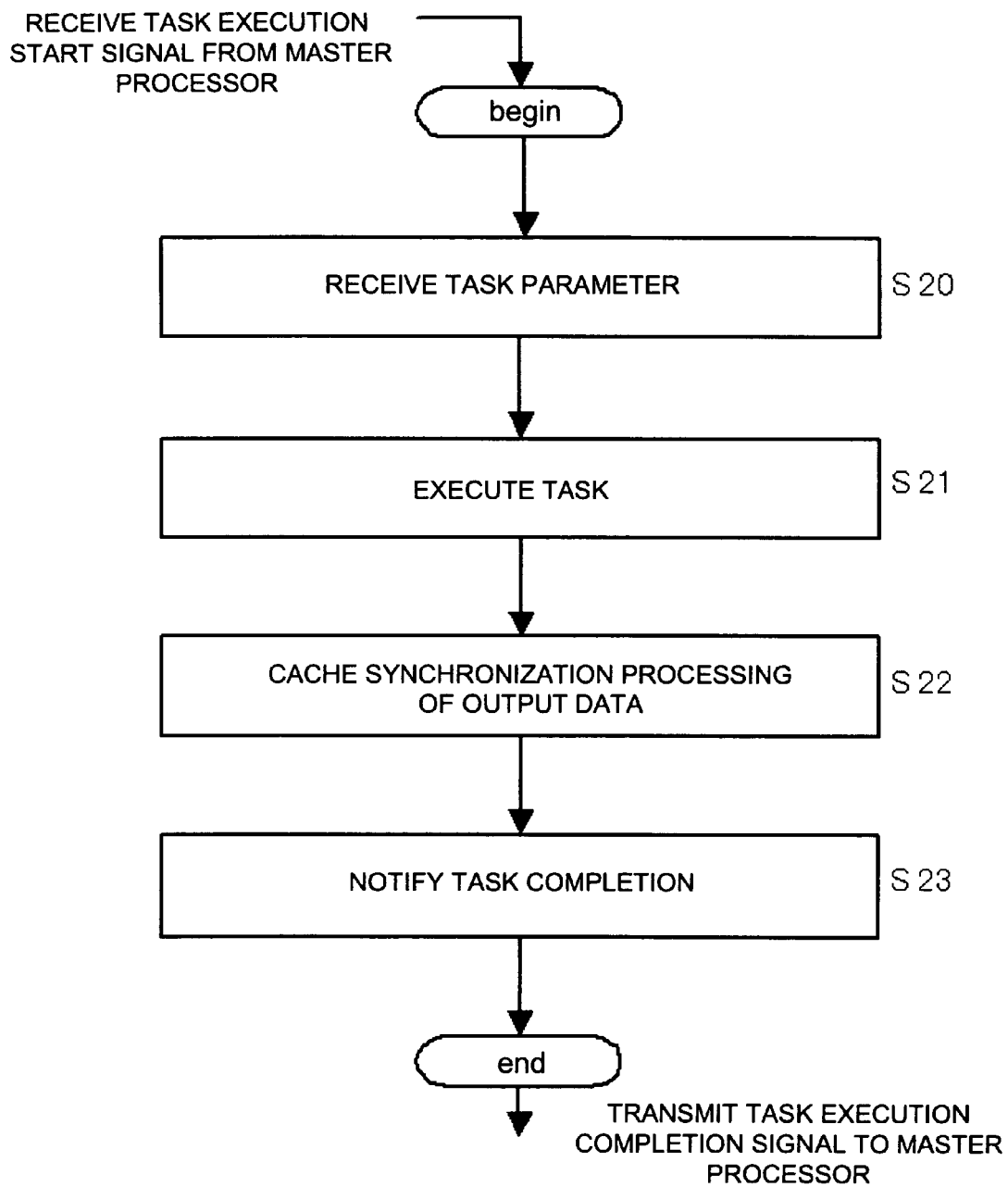
FIG. 6 is a flow chart of task execution in the cache synchronization control method according to an exemplary embodiment.

FIG. 6 shows a specific procedure of the task execution step (step S200).

The task execution step (step S200), making reference to FIG. 6, includes steps of task parameter reception (step S20), task execution (step S21), cache synchronization processing of output data (step S22), and notification of task completion (step S23).

Figure 7:
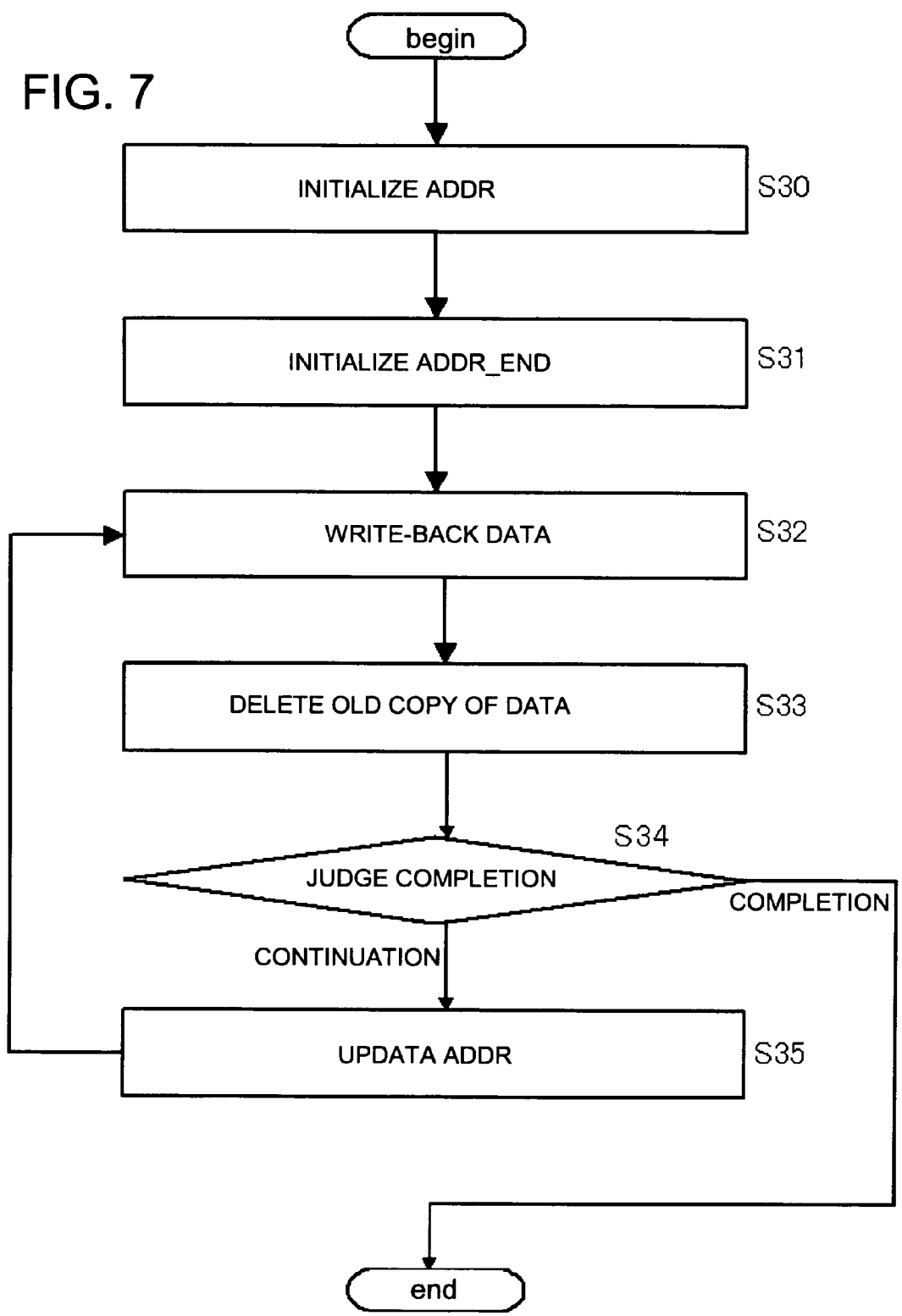
FIG. 7 is a flow chart of cache synchronization processing in the cache synchronization control method according to an exemplary embodiment.

FIG. 7 shows a detailed procedure of the cache synchronization processing of input data (step S12) or the cache synchronization processing of output data (step S22). These steps of cache synchronization processing include processes of initialization of an address variable ADDR (step S30), initialization of an address variable ADDR_END (step S31), writeback of data (step S32), deletion of an old copy of data (step S33), judgment of completion (S34), and updating of the address variable ADDR (step S35).

By the abovementioned procedure, coherence of contents of a plurality of caches is maintained for each of the small programs referred to as tasks. Therefore, it is possible to synchronize the contents of a plurality of data caches, without a programmer explicitly setting a synchronization point. Furthermore, since the data necessary for the cache synchronization processing is limited to the input data and the output data of a task, it is possible to synchronize the contents of the caches for only specified data, without scanning all the cache blocks of the caches.

All steps or a part of the steps of the cache synchronization control method based on task execution in the present exemplary mode may be implemented as a program running on processors.

<Examples>

Referring to the drawings, a description is given concerning an example of a cache synchronization control method based on task execution.

Figure 1:
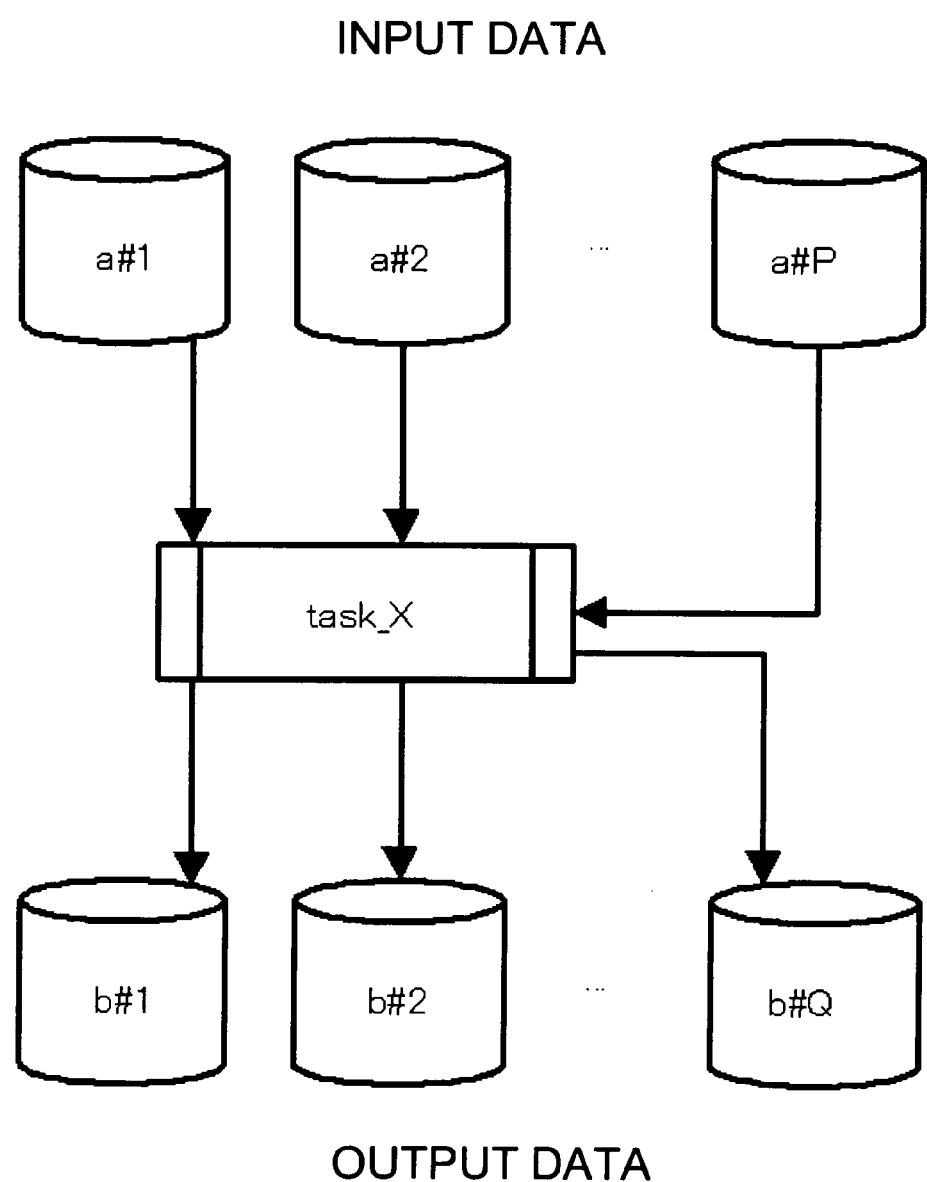
FIG. 1 is a conceptual diagram of a task.

A description is given concerning a task in the present example. The task in the present example is similar to a function in the C language. That is, the task is a small-sized program, having input data and output data. The input data is data given to the task from outside, and all data from outside referred to by the task is included in the input data. The output data is all data transferred by the task to the outside. FIG. 1 shows a conceptual diagram of the task.

There may be no input data nor output data for the task, or there may be a plurality of data items. Certain input data items may be included in the output data. Data (local data) that is generated only in the task and disappears is not included in the abovementioned input data and output data.

The input data and the output data are specified by start addresses and data sizes. The start addresses indicate what positions the input data and output data are stored at in a storage device. The data sizes indicate the sizes of the input data and the output data.

Figure 2:
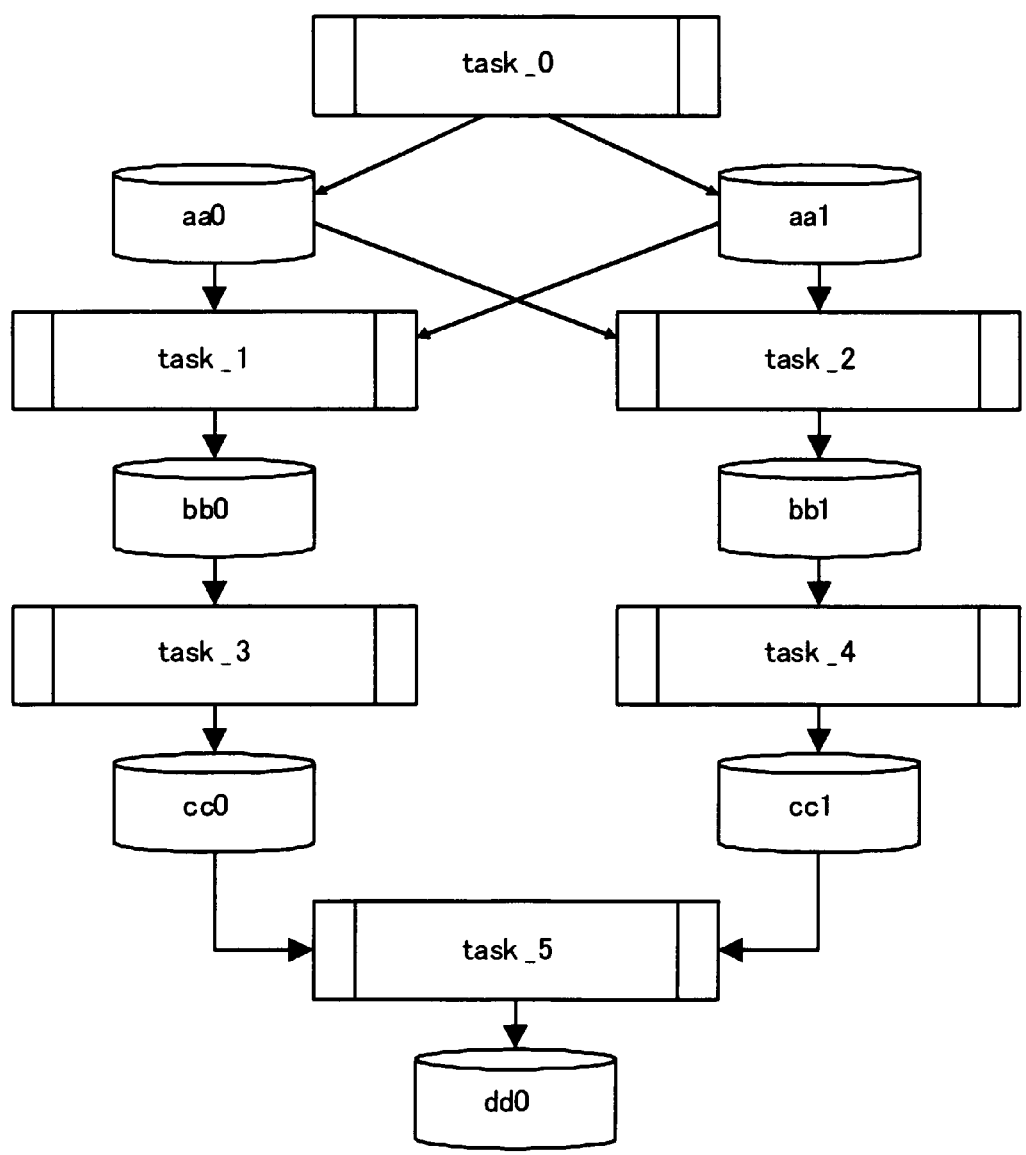
FIG. 2 is a drawing representing an example of a data flow graph of a task.

The task in the present example has input data given from the outside and output data transferred to the outside. Using information of this input data and output data, it is possible to represent dependency relationships among a plurality of tasks in a graph. The graph is generally referred to as a data flow graph. The data flow graph represents dependency relationships of the task. Furthermore, these dependency relationships show execution order of tasks and the possibility of parallel execution of tasks. An example of the data flow graph is shown in FIG. 2.

Task and data flow graph concepts have been known heretofore. For example, a macro task described in Patent Document 3 is similar to a task in the present example. Patent Document 3 describes a multiprocessor in which one program is divided into a plurality of macro tasks, and these macro tasks are processed in parallel. Furthermore, Patent Document 4 describes a method of executing and a method of developing a program based on data flow.

By using tasks and a data flow graph, it is possible to know which data is shared between tasks. The present example uses this type of characteristic of tasks and a data flow graph to maintain coherence of a plurality of caches.

In the present example, a task execution order is determined based on task dependency relationships with regard to the input data and the output data. An execution start point and an execution completion point of a task are regarded as synchronization points in a barrier synchronization method disclosed in Patent Documents 1 and 2. Furthermore, in the present example, task execution is controlled so that two or more tasks do not write different values to the same address in the storage device. At implicit synchronization points, which are the execution start point and the execution completion point of a task, cache coherence is preferably maintained for only the input data and the output data of the task. Since it is possible to explicitly know what data the coherence of the cache concerns and when maintenance of the coherence is preferably performed, in the present example of a complicated circuit for cache coherence maintenance is not necessary.

Figure 3:
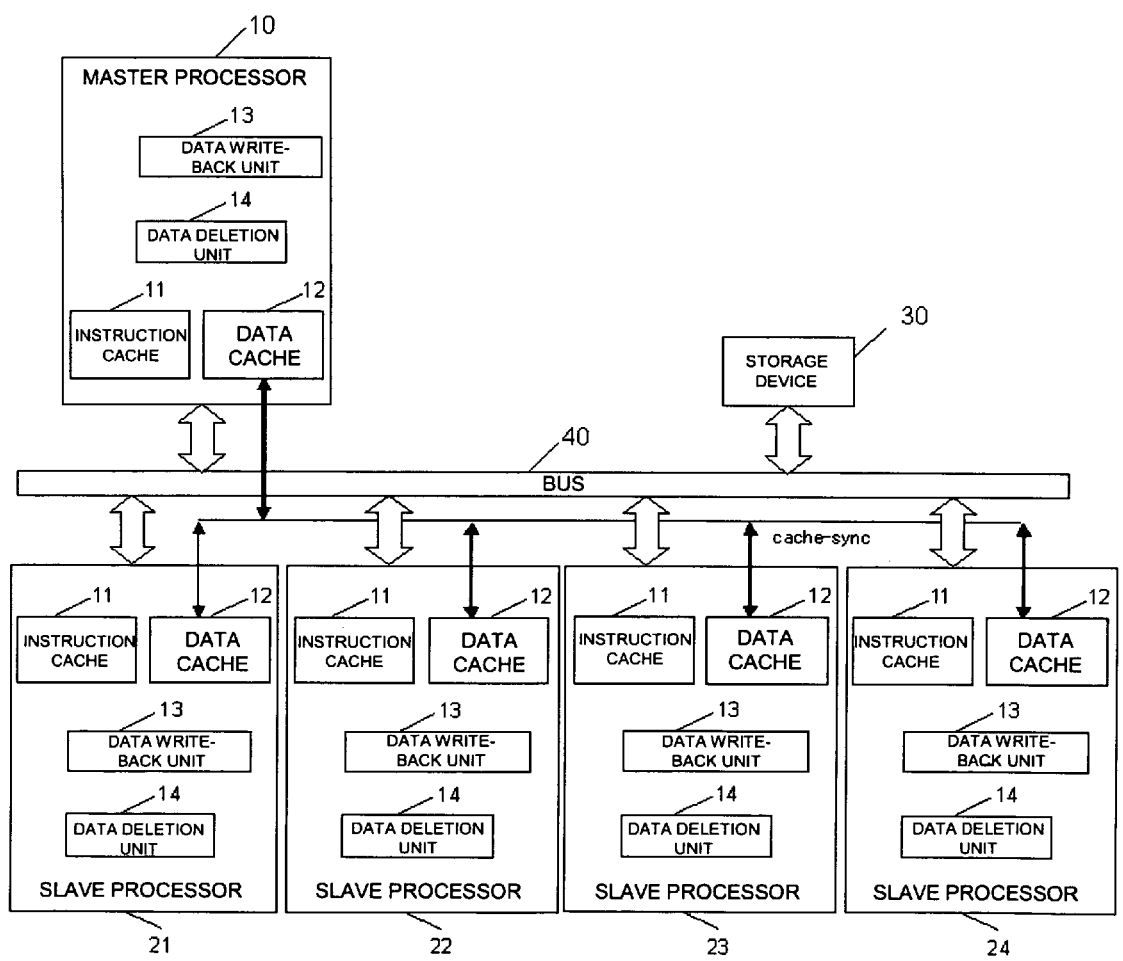
FIG. 3 is a configuration drawing of a multiprocessor according to an exemplary embodiment.

A description is given concerning a configuration of a multiprocessor according to the present example. The configuration of the multiprocessor in the present example is shown in FIG. 3.

The multiprocessor in the present example is provided with one master processor 10 and a plurality of slave processors 21 to 24. The master processor 10 manages progress of an entire program and execution of tasks. The slave processors 21 to 24 execute the tasks. FIG. 3 shows 4 slave processors 21 to 24. However, the multiprocessor in the present example can be provided with an arbitrary number of one or more slave processors. The master processor 10 and the slave processors 21 to 24 are each provided with an instruction cache 11 and a data cache 12. The master processor 10 and the slave processors 21 to 24 are connected to a bus 40. A storage device 30 is also connected to the bus 40. The storage device 30 holds a program and data for the master processor 10 and the slave processors 21 to 24. The storage device 30 may consist of main memory only, or may consist of a combination of a secondary cache and the main memory. In a storage device 30 formed from a combination of the secondary cache and the main memory, the main memory is accessed via the secondary cache. The secondary cache holds a copy of data of the main memory that has been recently accessed. When a processor attempts to read data from the main memory via the secondary cache, in a case where the copy of the data exists in the secondary cache, the secondary cache returns the copy of the data to the processor. On the other hand, in a case where a copy of the data does not exist in the secondary cache, the secondary cache reads the data from the main memory, copies the data into the secondary cache, and returns the data to the processor.

A data write-back unit 13 of each processor writes back the input data of a task before task execution or the output data of the task after task execution to the storage device 30 from the data cache 12. The data write-back unit 13, when writing back the data from the data cache 12 to the storage device 30, transmits a cache-sync signal to another processor. The data write-back unit 13 may be embedded in the processor as software or a circuit. In the present example, the data write-back unit is assumed to be embedded in the processor as software.

A data deletion unit 14 of each processor deletes data that was written back to the storage device 30 by the data write-back unit 13 of another processor, from its own data cache 12. When the cache-sync signal is transmitted from the data write-back unit 13 of a certain processor to another processor, the data deletion unit 14 of the other processor that has received this signal deletes the data that was written back to the storage device 30 by the data write-back unit 13, from its own data cache 12.

The data deletion unit 14 may be embedded in the processor as software or as a circuit. In the present example, the data deletion unit 14 is assumed to be embedded in the processor as a circuit.

The instruction cache 11 is a cache for storing a program. Each processor reads the program via the instruction cache 11 from the storage device 30. The data cache 12 is a cache for storing data. Each processor reads the data from the storage device 30 via the data cache 12, and writes to the storage device 30. Cache block sizes of the instruction cache 11 and the data cache 12 are assumed to be, for example, each 32 bytes.

The data cache 12 is assumed to be a general write-back type cache. That is, each cache block of the data cache 12 holds information referred to as a valid flag, a dirty flag, and a tag. The valid flag is information of one bit indicating that a copy of data in the storage device 30 is present in the cache block. The dirty flag is information of one bit indicating that content of the copy has been changed. The tag is information indicating an address of data stored in the cache block. The tag is information that can be uniquely computed based on the address.

Figure 14:
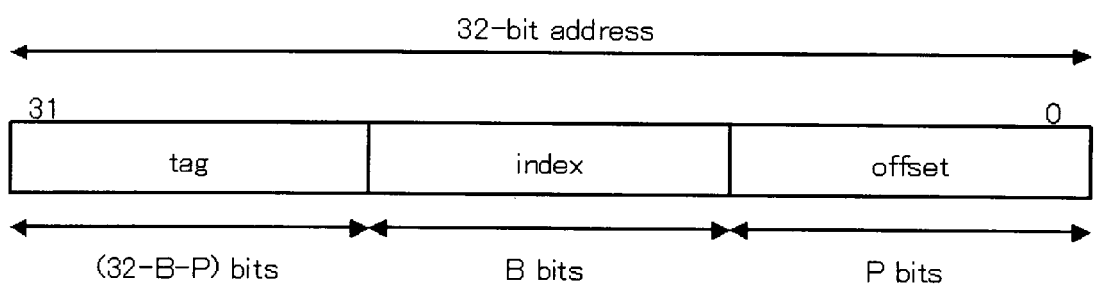
FIG. 14 is a drawing showing a cache tag computation method in a direct mapping method.

FIG. 14 shows one example of a configuration of a tag. FIG. 14 is a drawing showing a tag computation method for a cache in a direct mapping method. According to FIG. 14, by dividing a 32 bit address into three: an offset field, an index field, and a tag field, sequentially from a LSB side, the tag is obtained from the address. The offset field represents a position of data inside a cache block. The index field represents the number of the cache block. The tag field represents the tag of this address. The width P of the offset field is determined by the size of the cache block. The width B of the index field is determined by the size of the cache block and the capacity of the cache. The width of the tag field is (32-B-P) bits. A tag computation method of FIG. 14 is an example; how a tag is computed depends on the block size of the cache and the number of associated sets.

In a state in which data is not stored in a cache block, the valid flag and the dirty flag of this cache block are both "0". In a case where data is stored in the cache block, the valid flag of this cache block is set to "1". In a case where data in the cache block is changed, the dirty flag of this cache block is set to "1".

If a valid flag of a cache block is set to "0", the data of the cache block is deleted from the cache. In a case where data of a cache block having a dirty flag of "1" is written back to the storage device 30 from the data cache, the data of this cache block matches the data of the storage device 30. Therefore, the dirty flag of this cache block is set to "0".

In a case where a copy of data in the storage device 30 is stored in a cache block having a dirty flag of "0", the tag of the address of the data and the data are stored in this cache block and additionally the valid flag of this cache block is made "1". On the other hand, in a case where a copy of new data in the storage device 30 is stored in a cache block having a valid flag of "1" and a dirty flag of "1", after writing back old data of this cache block to the storage device 30 and making the dirty flag "0", the tag of the address of the data and the data are stored in this cache block and additionally the valid flag of this cache block is made "1".

The instruction cache 11 is used only for reading instructions, and the processor does not change a fragment of a program stored in the instruction cache 11 to content different from the storage device. Therefore, in maintaining coherence of the contents of a plurality of caches, it is sufficient to target only the data cache 12. In the following, a description is given concerning a method of maintaining the coherence of the contents of a plurality of data caches 12 in FIG. 3.

A description is given concerning a procedure of generating and executing a task according to the present example, making reference to FIG. 4. In step S100, a task is generated, and in step S200 the task is executed. Step S100 is executed by the master processor 10. Step S200 is executed by one of the slave processors. In step S100 task generation parameters are necessary. In step S200, task execution parameters are necessary. The task generation parameters include the following four parameters.

"Task processing content task_X" is a parameter representing processing content of the task. This parameter is represented, for example, as a function pointer in the C language.

"Input data (a#1, a#2, . . . , a#P)" includes P items of input data for the task. P is an arbitrary integer not less than one. The input data is represented by a start address and data size in the storage device 30.

"Output data (b#1, b#2, . . . , b#Q)" includes Q items of output data of the task. Q is an arbitrary integer not less than one. The output data is represented by a start address and data size in the storage device 30.

"Information on input data required by cache synchronization processing" is information representing which input data requires the cache synchronization processing. When the task is generated, the cache synchronization processing is performed based on this information. The cache synchronization processing is described below.

The task execution parameters include three items: task processing content (task_X), input data (a#1, a#2, . . . , a#P), and output data (b#1, b#2, . . . , b#Q). Information on input data that requires the cache synchronization processing is not included in the task execution parameters.

A detailed description is given below concerning step S100 and step S200.

A description is given concerning a procedure of the task generation step (step S100). Four parameters are received in step S100 as shown in FIG. 4. The generation procedure for the task in step S100 is shown in FIG. 5. Based on the procedure of FIG. 5, the master processor 10 generates the task, and this task is executed in a slave processor. Processing content of each step in FIG. 5 is as follows.

In task executability judgment regarding input data (step S10), the master processor 10 checks whether the input data of the task has already been available. In a case where the input data of the task is included in output data of other tasks presently being executed, the master processor 10 judges that the input data has not yet been available. In other cases, the master processor 10 judges that the input data has been available.

Figure 10:
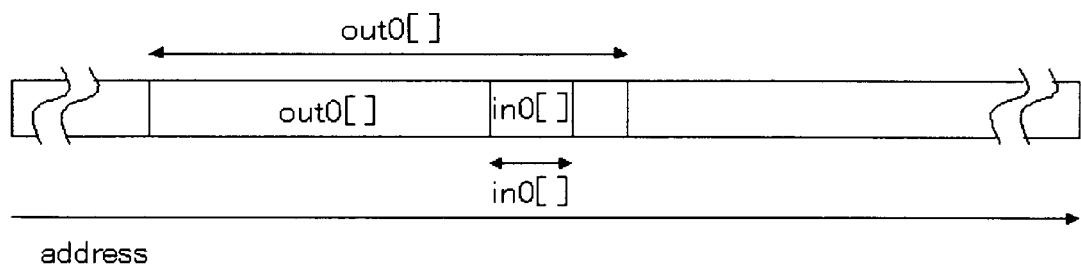
FIG. 10 is a drawing representing a state in which two items of data share the same address in a storage device.
Figure 11:
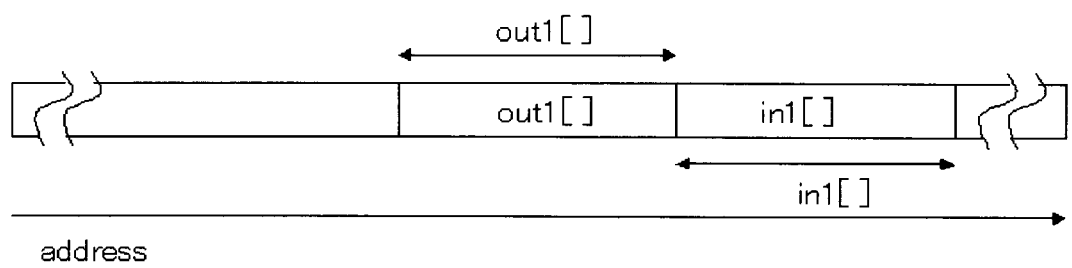
FIG. 11 is a drawing representing a state in which two items of data do not share entirely the same address in a storage device.

A description is given concerning the meaning of the term "is included" using FIG. 10 and FIG. 11. In a case where input data of the task and part of output data of another task presently being executed share the same address in the storage device 30 as shown in FIG. 10, the master processor 10 judges that the input data of the task is included in output data of another task. In other cases (refer to FIG. 11), the master processor 10 judges that the input data of the task is not included in output data of another task.

The master processor 10 repeats this step S10 until all of the input data of the task has been available. While the master processor is repeating step S10, eventually the task being executed is completed, this completion is notified to the master processor 10 by an interrupt signal, and the number of tasks presently being executed decreases. Thus step S10 is eventually completed, and a transition can be made to a subsequent step S11.

Next, in the task executability judgment regarding output data (step S11), the master processor 10 checks whether or not output data of the task is overlapping output data of another task presently being executed.

Figure 12:
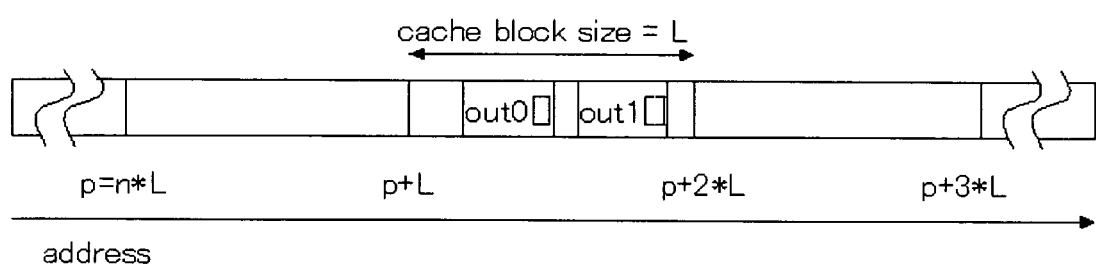
FIG. 12 is a drawing representing two items of data being stored in the same L byte memory block in the storage device.
Figure 13:
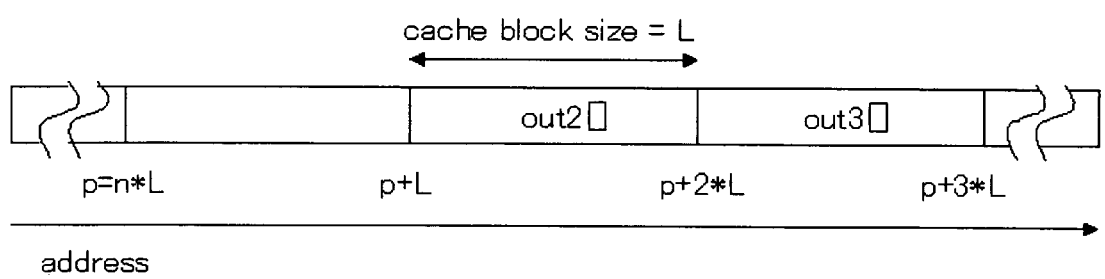
FIG. 13 is a drawing representing 2 items of data being stored in different L byte memory blocks in a storage device.

A description is given concerning the meaning of the term "is overlapping" using FIG. 12 and FIG. 13. If part of the output data of the task and a part of output data of any other task presently being executed are stored in the same L-byte memory block in the storage device 30 as shown in FIG. 12, the master processor 10 judges that the output data of the task is overlapping other output data. Here, the L-byte memory block is a memory block of a size equal to the cache block of the slave processor, and the start address of the L-byte memory block is aligned to a boundary of L bytes.

On the other hand, if part of the output data of the task and a part of output data of any other task presently being executed are stored in different L-byte memory blocks in the storage device 30 as shown in FIG. 13, the master processor 10 judges that the output data of the task is not overlapping other output data. The master processor 10 repeats this step S11 until it can be judged that the output data of the task is not overlapping other output data.

While the master processor 10 is repeating step S11, eventually the task being executed will be completed, this completion will be notified to the master processor 10 by an interrupt signal, and the number of tasks presently being executed will decrease. Thus step S11 is eventually completed, and a transition can be made to the subsequent step S12.

In the cache synchronization processing of input data (step S12), in a case where there is data written by the master processor 10 in the input data to the task, the master processor 10 uses the data write-back unit in order to write back the input data to the storage device 30, and performs the cache synchronization processing. The input data that is a target of the cache synchronization processing is shown in the task generation parameters passed to the task in step S100. The cache synchronization processing is described below.

In a task assignment step (step S13), the master processor 10 selects one of the slave processors in which the task is to be executed. The selected slave processor is taken as p_n.

In a task transfer step (step S14), the master processor 10 transfers parameters necessary for execution of the task to the slave processor p_n. A storage location for the parameters may be the storage device 30, or may be a memory or register dedicated to parameter storage. In the present example, the parameters are stored in the storage device 30. The master processor 10 instructs the slave processor p_n to start the execution of the task. The parameters necessary for execution of the task are three parameters: a start address of a function representing processing content of the task, output data of the task, and input data to the task.

Next, a description is given concerning a procedure of the task execution step (step S200). Three parameters are received in step S200 as shown in FIG. 4. The task is generated according to the procedure of step S10 to step S14 as already described, and this generated task is executed by any of the slave processors. Here, the slave processor that executes the task is p_n. The execution procedure of the task in step S200 is shown in FIG. 6. Referring to FIG. 6, processing content of each step in which the slave processor executes the task is as follows.

In a task parameter reception step (step S20), the slave processor p_n receives parameters of the task passed in step S14.

In a task execution step (step S21), the slave processor p_n executes the task based on the parameters of the task.

In a cache synchronization processing step of output data (step S22), after the task execution has been completed, the slave processor p_n uses the data write-back unit 13 in order to write back all the output data of the task to the storage unit 30, and executes the cache synchronization processing. The data that is a target of the cache synchronization processing is all the output data of the task. The cache synchronization processing is described below.

In the task completion notification step (step S23), the slave processor p_n notifies completion of execution of the task to the master processor 10.

Next, a description is given concerning the cache synchronization processing that appeared in step S12 and step S22 as described above. The cache synchronization processing is a process that is executed by the master processor 10 or the data write-back unit 13 and the data deletion unit 14 of the slave processor. The processor that executes the cache synchronization processing is assumed to be the processor p_cc. A procedure of the cache synchronization processing is shown in FIG. 7. In a case where there are plural items of data that are targets of the cache synchronization processing, the procedure of FIG. 7 is repeated for each item of data. Processing content of each step of FIG. 7 is as follows.

In an ADDR initialization step (step S30), a start address of data that is a target of the cache synchronization processing is substituted into a variable ADDR.

In an ADDR_END initialization step (step S31), a value that is one subtracted from the sum of the data size and the start address of the data that is a target of the cache synchronization processing, is substituted into a variable ADDR_END. The variable ADDR_END represents an end address of the data that is a target of the cache synchronization processing.

In a data write-back step (step S32), the processor p_cc writes back data of an address shown by the variable ADDR from a data cache to the storage device 30. This writing back is performed by the data write-back unit 13 of the processor p_cc, as follows. First, the data write-back unit 13 checks whether or not a cache block having a tag the same as a tag of the variable ADDR is present in the data cache. In a case where this type of cache block is present, and the valid flag and the dirty flag of the cache block are both "1", the data write-back unit 13 puts the dirty flag of the cache block to "0", after writing back the data of the cache block to the storage unit 30. In order to notify other processors that the processor p_cc has written back the data of the cache block to the storage unit 30, during execution of this write-back, the data write-back unit 13 transmits a cache-sync signal to the other processors.

In a step of deletion of an old copy of the data (step S33), a copy of the data of the address shown by the variable ADDR is deleted from the data cache of the processors outside of the processor p_cc. This deletion is performed by the data deletion unit 14 in the processors as follows. The data deletion unit 14 in all other processors that have received the cache-sync signal transmitted by the data write-back unit 13 of the processor p_cc, reads the address of data flowing in the bus 40. The data deletion unit 14 checks whether or not a cache block, having a tag the same as a tag of the address, is present in its own data cache. In a case where this type of cache block is present, and a valid flag of the cache block is "1", the data deletion unit 14 puts the valid flag of the cache block to "0".

In a judgment of completion process (step S34), if addresses indicated by the variable ADDR and the variable ADDR_END are included in the same cache block, the cache synchronization processing is ended.

In an ADDR updating step (step S35), the size of the cache block of the data cache is added to the variable ADDR, and control returns to step S32.

Operation of the present example is described based on a specific example. A C language function add_vectors_4( ) that executes an addition of four vectors and one scalar value is shown in FIG. 8. In order to use the cache synchronization control method based on task execution of the present example, a modified version of FIG. 8 is as in FIG. 9. In FIG. 9, after dividing the four vectors in two sets of two and obtaining the sum of each thereof, the total of the obtained sums is calculated. A function add_vec_2_scalar( ) is a function that calculates the sum of two vectors and one scalar. The function add_vec_2_scalar( ) is called by the function add_vectors_4( ) via a function exec_task( ). The function exec_task( ) is a function that executes a task.

The function add_vectors_4( ) uses a structure referred to as an operand in order to represent input data and output data of a task. This structure has two member variables representing a start address and data size. By using the structure operand, it is possible to send to the task the start address and the data size of the input data and the output data. The task retrieves the input data and the output data from an array of the structure operand, and executes some sort of calculation.

A description is given concerning the function add_vectors_4( ) of FIG. 9. The function add_vectors_4( ) is divided into the following four processes. Content of each of the processes is described as follows.

First, temporary data storage memory area is allocated. A memory area for a vector sum_wx[ ] that stores the sum of vectors w[ ] and x[ ], and a vector sum_yz[ ] that stores the sum of vectors y[ ] and z[ ] is allocated using a function malloc( ).

Next, task parameters are created. To execute the addition of the four vectors w[ ], x[ ], y[ ], and z[ ] and a scalar value k by the following three tasks, parameters to be given to the three tasks are created. The parameters are stored in an array of the structure referred to as an operand. At the end of the array, 0, representing an end point, is stored.

Task #1 is a task in which the sum of vectors w[ ] and x[ ] and a scalar value "value" is substituted into sum_wx[ ] (here, "value"=k).

Task #2 is a task in which the sum of vectors y[ ] and z[ ] and the scalar value "value" is substituted into sum_yz[ ] (here, "value"=0).

Task #3 is a task in which the sum of vectors sum_wx[ ] and sum_yz[ ] and the scalar value "value" is substituted into out[ ] (here, "value"=0).

Next, generation and execution of the task are preformed. The abovementioned three tasks are called sequentially. All operations of the abovementioned three tasks are the same, but input data and output data are different. An operation common to the three tasks is the function add_vec_2_scalar( ). The function exec_task( ) is used in task generation. This function exec_task( ) executes from step S10 to step S14. Any of the slave processors execute the task generated based on step S20 to step S23. Since the function add_vectors_4( ) generates three tasks, the function exec_task( ) is called three times.

Next, temporary data storage memory area is released. The memory area for the vectors sum_wx[ ] and sum_yz[ ] and the scalar value "value" is released.

A detailed description is given concerning task generation and task execution with regard to the function add_vectors_4( ).

Figure 15:
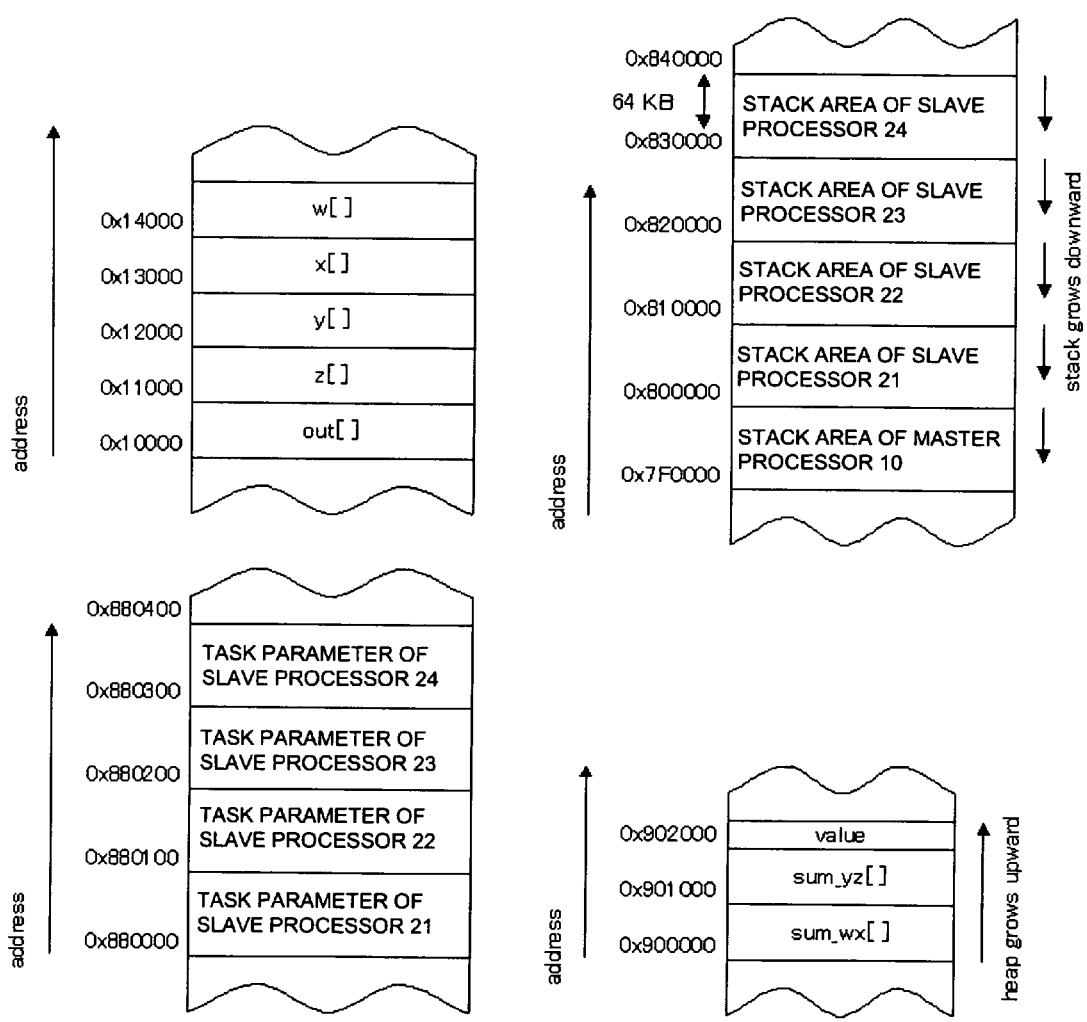
FIG. 15 is a drawing representing memory assignment in a multiprocessor according to an exemplary embodiment.

Memory allocation of the multiprocessor in the present example is shown in FIG. 15. Stack regions of the master processor 10 and the slave processors 21, 22, 23, and 24 are respectively 64 kbytes, allocated in the storage device 30. With sizes of the array out[ ], w[ ], x[ ], y[ ], and z[ ], given as arguments of the function add_vectors_4( ) each being 4 kbytes, the allocation is done sequentially from address 0x10000. Furthermore, a heap area used by a function malloc( ) is allocated after address 0x900000. That is, the arrays sum_wx[ ] and sum_yz[ ] and the scalar value "value" allocated by the function malloc( ), are allocated after the address 0x900000. By this type of memory allocation, the function add_vectors_4( ) is assumed to be executed. Furthermore, at a point in time of execution disclosure of the function add_vectors_4( ), it is assumed that the task is entirely unexecuted.

Based on the above assumption, a description is given concerning a first time function exec_task( ) in the function add_vectors_4( ). The function exec_task( ) is a function that generates a specified task, and processing content thereof is from step S10 to step S14. The function exec_task( ) has four arguments. More specifically, the four arguments are: a function pointer representing processing content of the task, a pointer of a structure "operand" with regard to the output data, a pointer of a structure "operand" with regard to the input data, and a pointer of a structure "operand" with regard to the input data required by the cache synchronization processing.

In the first-time exec_task( ) of the function add_vectors_4( ), a task operation is the function add_vec_2_scalar( ). Furthermore, information of the output data is stored in an array op_out0[ ], information of the input data is stored in an array op_in0[ ], and information of the input data required by the cache synchronization processing is stored in the array op_sync0[ ]. A task generated by the first-time exec_task( ) of the function add_vectors_4( ) is referred to as task #1.

First, this function exec_task( ) executes step S10. Step S10 is a process of judging whether task #1 can be executed with regard to the input data. Input data for the first-time exec_task( ) of the function add_vectors_4( ) includes the arrays w[ ] and x[ ] and the scalar value "value". Since, at a point in time of beginning execution of the function add_vectors_4( ), it is assumed that any task is entirely unexecuted, another task with the arrays w[ ] and x[ ] and the scalar value "value" as output data, is not executed at this point in time. Therefore, in the first-time exec_task( ) of the function add_vectors_4( ), task #1 can be executed with respect to the input data.

Next, the function exec_task( ) executes step S11. Step S11 is a process of judging whether or not task #1 can be executed with respect to the output data. Output data for the first-time exec_task( ) of the function add_vectors_4( ) is the array sum_wx[ ]. In step S11, the function exec_task( ) checks whether this array overlaps the output data of other tasks presently being executed. Since, at a point in time of beginning execution of the function add_vectors_4( ), it is assumed that any task is entirely unexecuted, the array sum_wx[ ] does not overlap with the output data of other tasks presently being executed. Therefore, in the first-time exec_task( ) of the function add_vectors_4( ), task #1 is executable with respect to the output data.

Next, the function exec_task( ) executes step S12. Step S12 is a process that performs the cache synchronization processing with respect to the input data. Immediately before the first-time exec_task( ), a variable k is substituted into the scalar value "value". The scalar value "value" is one item of the input data of the first-time exec_task( ). Therefore, in order to store a new value of this scalar value "value" in the storage device 30, the cache synchronization processing is necessary with respect to the scalar value "value". Due to this reason, information of the input data required by the cache synchronization processing is stored in the array op_sync0[ ], and this is the address and data size of the scalar value "value". Consequently, processing from step S30 to step S35 is executed with respect to the scalar value "value".

Next, a description is given concerning the cache synchronization processing with respect to the scalar value "value". First, a start address 0x902000 of the scalar value "value" is substituted into the variable ADDR (step S30). Next, an end address (0x902000+4−1)=0x902003 of the scalar value "value" is substituted into the variable ADDR_END (step S31). Next, the data write-back unit of the master processor 10 writes back a cache block having a tag the same as a tag of the address 0x902000 indicated by the variable ADDR, from the data cache of the master processor 10 to the storage device 30 (step S32). In a case where there is a cache block having this type of tag in the data cache of the master processor 10, the data write-back unit of the master processor 10 writes back data of this cache block to the storage device 30, a dirty flag of this cache block is made "0", and furthermore a cache-sync signal is transmitted to all the other processors. Next, in order to delete an old copy of the scalar value "value" from the other processors, a cache block having a tag the same as the tag of the address 0x902000 indicated by the variable ADDR, is deleted from data caches outside of the master processor 10 (step S33). If such a cache block is present in the data caches of processors that have received a cache-sync signal transmitted from the master processor 10, and a valid flag of this cache block is "1", the data deletion units of all processors outside of the master processor 10 set the valid flag of the cache blocks thereof that are present in their own data caches to "0". Next, in a case where addresses indicated by the variable ADDR and the variable ADDR_END are present in the same cache block, the cache synchronization processing is ended (step S34). At this point in time, since ADDR=0x902000, ADDR_END=0x902003, and the size of the cache block is 32 bytes, addresses indicated by the variable ADDR and the variable ADDR_END are present in the same cache block. Therefore, the cache synchronization processing is ended (step S34).

Next, the function exec_task( ) executes step S13. Step S13 is a process that assigns a task to any of the slave processors. Various methods concerning which slave processor to select can be considered. Selection of the slave processor may be done by any standard, but a method is desirable in which it is possible to select a slave processor such that the task can be executed and completed as early as possible. In the present example, a round robin algorithm is used. The round robin algorithm is an algorithm that assigns tasks to the slave processors in number sequence as in 21, 22, 23, 24, 21, 22 . . . . In a case where a selected slave processor is executing a task, a task is assigned to a slave processor of the next number. In the first-time exec_task( ) of the function add_vectors_4( ), task #1 is assigned to the slave processor 21. The master processor 10 stores information on which task is assigned to which slave processor, and information on which slave processor is available. These items of information are referred to in step S10 and step S11 for a new task.

Next, the function exec_task( ) executes step S14. Step S14 includes processing to transfer parameters necessary for execution of a task to a slave processor. Parameters necessary for execution of the task are: (1) a start address of a function representing processing content of the task, (2) output data of the task, and (3) input data to the task. In the first-time exec_task( ) of the function add_vectors_4( ), (1) is the start address of the function add_vec_2_scalar( ), (2) is each element of the array op_out0[ ], and (3) is each element of array op_in0[ ].

The storage device 30 is used in transferring the parameters. Memory areas for storing task parameters are determined for each slave processor. For example, a memory area of address 0x880000 to 0x8800FF is an area for storing parameters of a task for the slave processor 21. The function exec_task( ) writes back parameters to be passed to the slave processor 21, in the storage device 30, and the slave processor 21 reads these parameters from the storage device 30. When the parameters are passed, the function exec_task( ) directly stores these parameters in the storage device 30, without going through the cache. A reason for not going through the cache is that the parameters are written immediately to the storage device 30.

At the end of step S14, the function exec_task( ) instructs start of execution of task #1 to the selected slave processor 21.

This instruction is transmitted as an interrupt signal to the slave processor 21. Thereafter, the master processor 10 executes a second time exec_task( ).

Next, a detailed description is given concerning execution of a task in the slave processor. In the slave processor, the task is executed in a sequence of step S20 to step S23. Here, a description is given with task #1, which was generated by the first-time exec_task( ) of the function add_vectors_4( ), as an example. As already described, task #1 is assigned to the slave processor 21.

First the slave processor 21 executes step S20. Step S20 is a process that receives parameters of the task. The slave processor 21 reads the parameters directly from the storage device 30, not going through its own data cache (step S20). A reason for not going through the data cache is in order not to leave a copy of an old parameter in the data cache.

Next, the slave processor 21 performs execution (step S21) of the task. The slave processor 21 retrieves the start address of each of the array op_out0[ ] and the array op_in0[ ] read from the storage device 30, and with these as arguments, calls the function add_vec_2_scalar( ). The slave processor 21 executes the function add_vec_2_scalar( ).

Next, the slave processor 21 executes step S22. Step S22 is cache synchronization processing for the output data of the task. The slave processor 21 performs the cache synchronization processing based on the start address and size of the output data stored in the array op_out0[ ]. The output data is written back from the data cache of the slave processor 21 to the storage device 30, and old copies of the output data are deleted from the data caches of the other processors. This writing back and deletion are processes from step S30 to step S35. The start address and size of one item of output data of sum_wx[ ] are stored in the array op_out0[ ]. Consequently, processing from step S30 to step S35 is executed with respect to the array sum_wx[ ].

Next, a description is given concerning the cache synchronization processing with respect to the array sum_wx[ ]. First, a start address 0x900000 of the array sum_wx[ ] is substituted into the variable ADDR (step S30). Next, an end address (0x900000+0x1000−1)=0x900FFF of the array sum_wx[ ] is substituted into the variable ADDR_END (step S31). Next, a cache block having a tag the same as the address 0x900000 indicated by the variable ADDR is written back to the storage device 30 from the data cache of the slave processor 21 (step S32). In a case where there is a cache block having this type of tag in the data cache of the slave processor 21, the data write-back unit of the slave processor 21 writes back data of this cache block to the storage device 30, a dirty flag of this cache block is made "0", and furthermore a cache-sync signal is transmitted to all the other processors. Next, in order to delete an old copy of the array sum_wx[ ] from the other processors, a cache block having a tag the same as the tag of the address 0x900000 indicated by the variable ADDR is deleted from data caches outside of the slave processor 21 (step S33). In a case where this type of cache block is present in the data caches of the processors that have received a cache-sync signal transmitted from the slave processor 21, and a valid flag of this cache block is "1", the data deletion units of all processors outside of the slave processor 21 set the valid flag of the cache blocks thereof that are present in their own data caches to "0". Next, in a case where addresses indicated by the variable ADDR and the variable ADDR_END are present in the same cache block, the cache synchronization processing is ended (step S34). At this point in time, since ADDR=0x900000 and ADDR_END=0x900FFF, and the size of the cache block is 32 bytes, addresses indicated by the variable ADDR and the variable ADDR_END are present in different cache blocks. Therefore, the cache synchronization processing is continued. Next, the size of a cash block, 32 bytes, is added to the variable ADDR (step S35), and control returns to step S32. Step S32 to step S35 are repeated until a judgment of completion (step S34) is made. When the judgment of completion is made, the variable ADDR is 0x900FE0. In a case where the variable ADDR has this value, since addresses indicated by the variable ADDR and the variable ADDR_END are present in the same cache block, the cache synchronization processing is ended (step S34).

Next, the slave processor 21 executes step S23. Step S23 is a process that provides notification of completion of the task to the master processor. 10. The slave processor 21 provides the notification of completion of the task to the master processor 10 using an interrupt signal.

Next, a description is given concerning a second time exec_task( ) in the function add_vectors_4( ). In the second-time exec_task( ) of the function add_vectors_4( ), a task operation is add_vec_2_scalar( ), and also, information of the output data is stored in an array op_out1[ ], information of the input data is stored in an array op_in1[ ], and information of input data required by the cache synchronization processing is stored in the array op_sync0[ ]. A task generated by the second-time exec_task( ) of the function add_vectors_4( ) is referred to as task #2.

First, in step S10, a judgment is made as to whether or not task #2 can be executed with respect to the input data. The input data of the second-time exec_task( ) includes arrays y[ ] and z[ ], and a scalar value "value". At this point in time, since another task having the arrays y[ ] and z[ ], and the scalar value "value" as output data is not present, in the second-time exec_task( ), task #2 can be executed with respect to the input data.

Next, a judgment is made as to whether or not task #2 can be executed with respect to the output data (step S11). Output data for the second-time exec_task( ) is the array sum_yz[ ]. At this point in time, the task being executed is task #1 generated by the first-time exec_task( ), and its output data is the array sum_wx[ ]. According to FIG. 15, the arrays sum_wx[ ] and sum_yz[ ] do not overlap in the storage unit 30. Therefore, in the second-time exec_task( ), task #2 can be executed with respect to the output data.

Next, the cache synchronization processing is performed with respect to the input data (step S12). Zero has been substituted into the scalar value "value" immediately before the second-time exec_task( ). The scalar value "value" is one item of the input data of the second-time exec_task( ). Therefore, in order to store a new value of this scalar value "value" in the storage device 30, the cache synchronization processing is necessary with respect to the scalar value "value". For this type of reason, information on the input data required by the cache synchronization processing is stored in the array op_sync0[ ]. This information is the address and data size of the scalar value "value". Consequently, similarly to the first-time exec_task( ), processing from step S30 to step S35 is executed with respect to the scalar value "value".

Next, task #2 is assigned to one of the slave processors (step S13). In the first-time exec_task( ), after selecting the slave processor 21, task #2 is assigned to the next slave processor 22 based on the round robin algorithm.

Next, parameters required for execution of task #2 are passed to the slave processor 22 (step S14). The necessary parameters are: (1) the start address of the function add_vec_2_scalar( ), (2) each element of the array op_out1[ ], and (3) each element of the array op_in1[ ]. When the parameters are passed, these parameters are directly stored in the storage device 30, without going through the cache. An area from address 0x880100 to 0x8801FF is a parameter storage area for the slave processor 22.

At the end of step S14, the function exec_task( ) instructs the start of execution of task #2 to the selected slave processor 22. This instruction is transmitted as an interrupt signal to the slave processor 22. Thereafter, the master processor 10 executes a third time exec_task( ).

Similar to the slave processor 21 executing task #1 generated by the first-time exec_task( ), the slave processor 22 executes task #2 generated by the second-time exec_task( ), based on from step S20 to step S23. The slave processor 21 reads parameters of task #2 directly from the storage device 30, not via the data cache, retrieves a start address of each of the array op_out1[ ] and the array op_in1[ ], and with these as arguments, executes the function add_vec_2_scalar( ). After executing task #2, the slave processor 22, having performed the cache synchronization processing with regard to the array sum_yz[ ], which is the output data of task #2, provides notification of completion of task #2 to the master processor 10.

Next, a description is given concerning a third-time exec_task( ) of the function add_vectors_4( ). In the third-time exec_task( ) of the function add_vectors_4( ), a task operation is the function add_vec_2_scalar( ). Furthermore, information on the output data is stored in the array op_out2[ ], and information on the input data is stored in the array op_in2[ ], respectively. In the third-time exec_task( ), there is no input data required to do the cache synchronization processing. A task generated by the third-time exec_task( ) of the function add_vectors_4( ) is referred to as task #3.

Next, a judgment is made as to whether or not task #3 can be executed with respect to the input data (step S10). The input data of the third-time exec_task( ) includes the arrays sum_wx[ ] and sum_yz[ ], and a scalar value "value". At this point in time, there exist task #1 that has the array sum_wx[ ] as output data, and task #2 that has the array sum_yz[ ] as output data. Task #1 that has the array sum_wx[ ] as output data is a task that is started by the first-time exec_task( ), and task #2 that has the array sum_yz[ ] as output data is a task that is started by the second-time exec_task( ). Until these tasks are completed, input data of the third-time exec_task( ) cannot be used. Therefore, the third-time exec_task( ) repeats step S10 until task #1 and task #2 are completed. Eventually, execution completion of task #1 and task #2 is notified to the master processor 10 by an interrupt signal. After both tasks have been completed, the third-time exec_task( ) determines that task #3 can be executed with respect to the input data.

Next, a judgment is made as to whether or not task #3 can be executed with respect to the output data (step S11). Output data for the third-time exec_task( ) is the array out[ ]. At this point in time, there is no task being executed. This is because in step S10, after task #1 and task #2 are completed, there is a transition to step S11. Therefore, since the array out[ ] does not overlap with output data of another task presently being executed, in the third-time exec_task( ), task #3 is judged to be capable of being executed with respect to the output data.

Next, in step S12, the cache synchronization processing with respect to the input data should be performed. However, in the third-time exec_task( ), the input data required by the cache synchronization processing is not given. Therefore, there is a transition to the subsequent step S13, without performing the cache synchronization processing.

Next, task #3 is assigned to one of the slave processors (step S13). Since the second-time exec_task( ) has selected the slave processor 22, task #3 is assigned to the next slave processor 23, based on a round-robin algorithm.

Next, parameters required for execution of task #3 are passed to the slave processor 23 (step S14). The necessary parameters are: (1) the start address of the function add_vec_2_scalar( ), (2) each element of the array op_out2[ ], and (3) each element of the array op_in2[ ]. When the parameters are passed, these parameters are directly stored in the storage device 30, without going through a cache. Referring to FIG. 15, an area from address x880200 to 0x8802FF is a parameter storage area for the slave processor 23.

At the end of step S14, the function exec_task( ) instructs the start of execution of task #3 to the selected slave processor 23. This instruction is transmitted as an interrupt signal to the slave processor 23. Thereafter, the master processor 10 executes the remainder of the program.

Similar to the slave processor 21 executing task #1 generated by the first-time exec_task( ), the slave processor 23 executes task #3 generated by the third-time exec_task( ), based on step S20 to step S23. The slave processor 23 reads parameters of task #3 directly from the storage device 30, not going through a data cache, retrieves a start address of each of the array op_out2[ ] and the array op_in2[ ], and with these as arguments, executes the function add_vec_2_scalar( ). After execution of task #3, the slave processor 23, having performed the cache synchronization processing with respect to the array out[ ], which is the data output of task #3, provides notification of task completion to the master processor 10 (step S23).

The abovementioned description was given based on the example, but the present invention is not limited to the above example.

INDUSTRIAL APPLICABILITY

The present invention can be applied to a multiprocessor formed of a plurality of processors having a cache. Furthermore, application is also possible to a compiler that generates code directed at this type of multiprocessor. From embedded applications to supercomputers, there exists a wide variety of what are referred to as multiprocessors. The present invention can be applied irrespective of scale thereof. Modifications and adjustments of embodiments and examples are possible within the bounds of the entire disclosure (including the scope of the claims) of the present invention, and also based on fundamental technological concepts thereof. Furthermore, a wide variety of combinations and selections of various disclosed elements are possible within the scope of the claims of the present invention.

What is claimed is:

1. A cache synchronization control method for a multiprocessor that has a plurality of processors each having a cache, and a storage device shared by said plurality of processors, said method comprising:
   before a task is executed, first writing back to said storage device input data of said task that is in the cache of a processor that manages said task, and deleting data corresponding to said input data from the cache of each of the other processors of the plurality of processors; and
   after said task is executed, second writing back to said storage device output data of the task that is in the cache of a processor that has executed said task and deleting data corresponding to said output data from the cache of each of the other processors of the plurality of processors.

2. The cache synchronization control method according to claim 1, wherein
   said first writing back and deleting said data corresponding to said input data comprises asking processors other than said processor that manages said task to delete data corresponding to said input data placed in their own caches; and said second writing back and deleting said data corresponding to said output data comprises asking processors other than said processor that has executed said task to delete data corresponding to said output data placed in their own caches.

3. The cache synchronization control method according to claim 1, wherein the multiprocessor further includes a network connecting the plurality of processors and the storage device, method controlling synchronization of said caches, when a program is divided into a plurality of small programs referred to as tasks, data given from another task to a task is termed as input data, data to be transferred by a task to another task is termed as output data, and a particular task is executed in said multiprocessor, said method comprising:

before the particular task is executed, first writing back to said storage device said particular task's input data placed in the cache of a processor that manages said particular task, and deleting an old copy of said particular task's input data placed in other processors' caches; and after said particular task is executed, second writing back to said storage device said particular task's output data placed in the cache of a processor that has executed said particular task, and deleting an old copy of said particular task's output data placed in other processors' caches.

4. The cache synchronization control method according to claim 3, wherein information on which input data should be written back to said storage device is given; and said first writing back and deleting before the particular task's execution comprises writing back only input data specified by said information from a cache to said storage device.

5. A multiprocessor comprising:

a plurality of processors each comprising a cache; and a storage device shared by said plurality of processors; wherein before a task is executed, a processor that manages said task is configured to write back input data of said task to said storage device, and the other processors of said plurality of processors are configured to delete data corresponding to said input data from their own caches; and after said task is executed, a processor that has executed said task is configured to write back output data of said task to said storage device, and the other processors of said plurality of processors are configured to delete data corresponding to said output data from their own caches.

6. The multiprocessor according to claim 5, wherein said plurality of processors includes a master processor and slave processors;

said one of the slave processors executes said task; and said master processor delegates said task to said slave processor executing said task.

7. The multiprocessor according to claim 5, further comprising a bus linking said plurality of processors and said storage device.

8. The multiprocessor according to claim 5, further comprising a network connecting said plurality of processors and said storage device, configured to divide a program into a plurality of small programs referred to as tasks, and to execute each task in any of said processors, wherein each of said plurality of processors comprises a data write-back unit and a data deletion unit;

each data write-back unit is configured so that, before execution of each task, the unit writes back input data to the storage device from a cache that holds input data of each task, and furthermore, after execution of each task, each unit writes back output data to the storage device from a cache that holds output data of task; and each data deletion unit is configured so that, each deletion unit deletes an old copy of input data from a cache that holds old copy of input data written back to the storage device by a data write-back unit before execution of each task, and furthermore, each deletion unit deletes an old copy of output data from a cache that holds old copy of output data written back to the storage device by a data write-back unit after execution of each task.

9. The multiprocessor according to claim 8, further comprising:

a master processor configured to control task execution order based on input data and output data of tasks; at least one slave processor configured to execute tasks;

a storage device configured to store input data and output data of tasks; and a network configured to connect said master processor and said at least one slave processor and the storage device; wherein each comprise a cache, a data write-back unit, and a data deletion unit;

each data write-back unit is configured so that, before execution of each task, the data write-back unit writes back input data to the storage device from a cache that holds input data of a task, and furthermore, after execution of each task, the data write-back unit writes back output data to the storage device from a cache that holds output data of a task; and each data deletion unit is configured so that, the deletion unit deletes an old copy of input data from a cache that holds old copy of input data written back to the storage device by a data write-back unit before execution of each task, and furthermore, each deletion unit deletes an old copy of output data from a cache that holds old copy of output data written back to the storage device by a data write-back unit after execution of each task.

10. A non-transitory computer readable storage medium, storing a cache synchronization control program for controlling a multiprocessor that has a plurality of processors each having a cache, and a storage device shared by said plurality of processors; wherein before execution of a task, said program causes a processor that manages said task to write back input data of said task to said storage device, and causes the other processors of the plurality of processors to delete data corresponding to said input data from their own caches; and after execution of said task, said program causes a processor that has executed said task to write back output data of said task to said storage device, and causes the other processors of the plurality of processors to delete data corresponding to said output data from their own caches.

11. The non-transitory computer readable storage medium according to claim 10, said cache synchronization control program causing said plurality of processors to perform synchronization control of caches, when a program is divided into a plurality of small programs referred to as tasks, and each task is executed in one of said plurality of processors, said program causing a processor to execute:

before execution of each task, writing back input data to the storage device from a cache that holds input data of a task, and deleting an old copy of a input data from a cache that holds old copy of input data; and after execution of each task, writing back output data to the storage device from a cache that holds output data of a task, and deleting an old copy of a output data from a cache that holds old copy of output data.

\* \* \* \* \*